(12) United States Patent
Roal et al.

(10) Patent No.: US 7,878,049 B2
(45) Date of Patent: Feb. 1, 2011

(54) METHOD AND SYSTEM FOR INDICATING A FAULT ASSOCIATED WITH A NON-COMBUSTION CHAMBER OF AN ENGINE

(75) Inventors: James Allen Roal, Chillicothe, IL (US); Richard "Cort" Severns, II, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 231 days.

(21) Appl. No.: 12/230,433

(22) Filed: Aug. 28, 2008

(65) Prior Publication Data
US 2010/0050754 A1 Mar. 4, 2010

(51) Int. Cl.
*G01M 15/09* (2006.01)
(52) U.S. Cl. .................................. 73/114.37
(58) Field of Classification Search ............. 73/114.32, 73/114.33, 114.37
See application file for complete search history.

(56) References Cited

U.S. PATENT DOCUMENTS

| | | | |
|---|---|---|---|
| 5,361,628 A | 11/1994 | Marko et al. | |
| 5,792,949 A | 8/1998 | Hewelt et al. | |
| 5,897,597 A | 4/1999 | O'Daniel | |
| 6,240,772 B1 | 6/2001 | Thomas | |
| 6,449,538 B1 | 9/2002 | Kubo et al. | |
| 6,561,015 B1 | 5/2003 | Pfeiffer | |
| 6,575,022 B1 * | 6/2003 | Schneider et al. ......... 73/114.01 |
| 6,679,228 B1 | 1/2004 | Confer et al. | |
| 6,732,522 B2 | 5/2004 | Wright et al. | |
| 6,999,869 B1 | 2/2006 | Gitlin et al. | |
| 7,047,798 B2 | 5/2006 | Esteghlal et al. | |
| 7,080,547 B2 | 7/2006 | Beyer et al. | |
| 7,261,091 B2 | 8/2007 | Reddy | |
| 7,373,923 B2 | 5/2008 | Trask et al. | |
| 7,426,924 B2 * | 9/2008 | Withrow et al. ............. 123/572 |
| 7,509,210 B2 * | 3/2009 | Tsuda et al. ................ 701/114 |
| 7,523,748 B2 * | 4/2009 | Hirano et al. ............... 123/572 |
| 7,712,456 B2 * | 5/2010 | Hirano ........................ 123/572 |
| 2001/0047801 A1 * | 12/2001 | Baeuerle et al. ............. 123/574 |
| 2005/0022795 A1 | 2/2005 | Beyer et al. | |
| 2006/0243258 A1 | 11/2006 | Withrow et al. | |

OTHER PUBLICATIONS

Cat C7 for Maximum Mid-Range Versatility, ACERT™ Technology for 2007, Caterpillar, 2007 (6 pgs.).

* cited by examiner

*Primary Examiner*—Freddie Kirkland, III
(74) *Attorney, Agent, or Firm*—Finnegan, Henderson, Farabow, Garrett & Dunner LLP

(57) ABSTRACT

A method of indicating a fault associated with a non-combustion chamber of an engine includes monitoring a fluid intake pressure for the engine, monitoring a pressure for a non-combustion chamber of the engine, and indicating a fault associated with the non-combustion chamber based on a difference between a first non-combustion chamber pressure and a second non-combustion chamber pressure being below a chamber threshold value.

16 Claims, 5 Drawing Sheets

METHOD AND SYSTEM FOR INDICATING A FAULT ASSOCIATED WITH A NON-COMBUSTION CHAMBER OF AN ENGINE

TECHNICAL FIELD

The present disclosure relates to a method and system for indicating faults in an engine. In particular, the disclosure relates to a method and system for indicating a fault associated with a non-combustion chamber of an engine.

BACKGROUND

Machines such as medium duty and heavy duty on-highway trucks, hydraulic excavators, wheel loaders, off-highway trucks, other heavy construction and mining machines, automobiles, motorcycles, and other equipment, are used to perform many tasks. To effectively perform these tasks, many of these machines require a power source, such as an internal combustion engine. Internal combustion engines often include an intake manifold, a housing, such as an engine block, and one or more working members, such as pistons. Typically, each working member is movably supported within the housing of the engine and separates a combustion chamber from a non-combustion chamber of the housing, such as a crankcase. Such engines combust air from the intake manifold, and fuel, in the combustion chamber to produce power by driving the working member.

High pressure in the intake manifold and combustion chamber may drive combustion gases and other intake gases through spaces between the housing and the working member, into the non-combustion chamber. These gases (sometimes referred to as "blow-by gases") may increase the pressure in the non-combustion chamber to a high level. The pressure in the non-combustion chamber may be relieved using a ventilation system, which results in predictable pressure changes in the non-combustion chamber as a result of intake pressure changes. However, in certain situations, the pressure may be relieved through cracks, corroded portions, faulty valves, or other faults in the non-combustion chamber and/or ventilation system, thereby leaking into the atmosphere.

Such leakage may result in unexpected pressure changes in the crankcase, and is typically undesired as it may decrease efficiency of the engine. Furthermore, venting combustion gases from the non-combustion chamber directly to the atmosphere has negative environmental consequences, and may cause a machine to fail to achieve required emissions standards.

One known method for determining a fault in a ventilation system of an engine is disclosed in U.S. Patent Application Publication No. 2005/0022795 A1, to Beyer et al. ("the '795 application"). The '795 application describes a method for determining a fault in the ventilation system of an engine by monitoring an intake manifold pressure for the engine, a crankcase ventilation pressure, and an ambient air pressure. The method determines a fault by determining at least one pressure differential between one of an intake manifold pressure and a pressure in the ventilation duct, and an ambient pressure and the pressure in the ventilation duct. However, the '795 application does not account for a time-based analysis of fluid pressure in the engine, and additionally fails to analyze the changes in crankcase pressure due to changes in intake pressure.

The engine of the present disclosure overcomes one or more of the problems discussed above, and/or other problems in existing technology.

SUMMARY

In one embodiment, a method of indicating a fault associated with a non-combustion chamber of an engine is disclosed. The method includes monitoring a fluid intake pressure for the engine, monitoring a pressure for a non-combustion chamber of the engine, and indicating a fault associated with the non-combustion chamber based on a difference between a first non-combustion chamber pressure and a second non-combustion chamber pressure being below a chamber threshold value.

In another embodiment, a method of indicating a potential fluid leakage in a container coupled to a compartment that releases fluid into the container is disclosed. The method includes monitoring a compartment fluid pressure in the compartment, monitoring a container fluid pressure in the container; and indicating a fluid leakage in the container based on a difference between a first container fluid pressure and a second container fluid pressure being below a threshold value.

In a further embodiment, an engine control module for an engine is disclosed. The engine includes one or more combustion chambers, a non-combustion chamber, and one or more working members between the one or more combustion chambers and the non-combustion chamber, the one or more working members permitting blow-by gasses to enter into the non-combustion chamber from the one or more combustion chambers. The engine control module includes a computer readable medium storing instructions. The instructions are configured to monitor a fluid intake pressure of gases entering the one or more combustion chambers from one or more fluid intake compartments, monitor a fluid pressure of gases in the non-combustion chamber; and transmit a signal which causes a message indicating a potential fluid leakage to be displayed, the signal being transmitted as a function of non-combustion chamber pressure changes resulting from intake pressure changes in the one or more fluid intake compartments.

DETAILED DESCRIPTION

Figure 1:
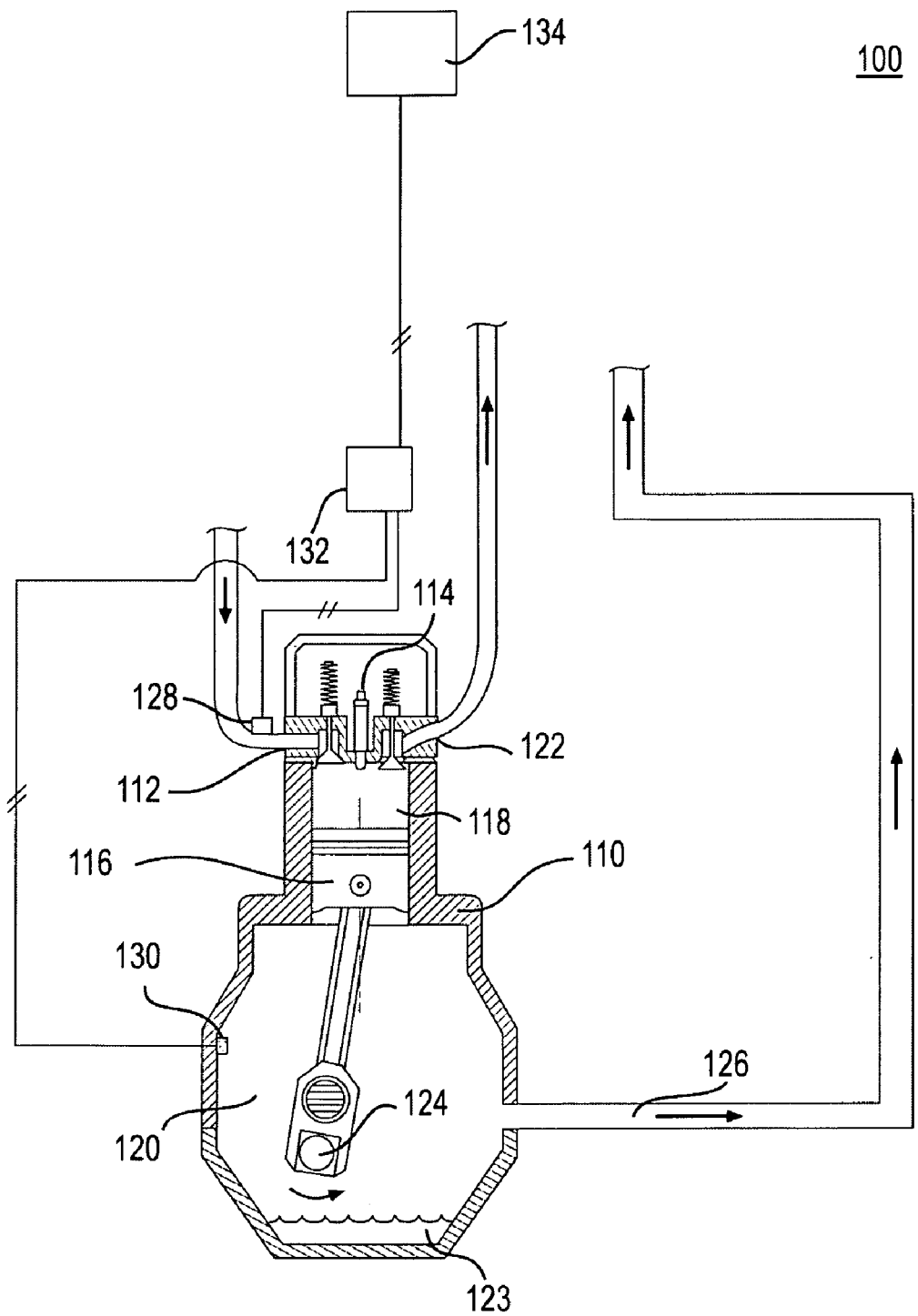
FIG. 1 illustrates an exemplary portion of an engine consistent with the present disclosure.

FIG. 1 provides a schematic illustration of a portion of an engine 100 consistent with the present disclosure. Engine 100 may include a housing 110, an air intake system 112, a fuel system 114, a working member 116, an exhaust system 122, and a chamber ventilation system 126. Working member 116 may be movably disposed in an interior of housing 110 such that it separates a combustion chamber 118 from a non-combustion chamber 120, such as a crankcase. As shown in FIG. 1, working member 116 may be a piston supported in a cylindrical portion of housing 110, and connected to a crankshaft 124. Oil 123 may reside within non-combustion chamber 120. Although FIG. 1 only shows one working member in one cylinder, engine 100 may include a plurality of working members and cylinders (e.g., 4, 6, 8, etc.), each having a combustion chamber, and coupled to housing 110, air intake system 112, fuel system 114, and exhaust system 122.

Engine 100 may also include intake pressure sensor 128 and non-combustion chamber pressure sensor 130, which sense the gas pressure inside the air-intake system 112 and non-combustion chamber 120, respectively. Pressure sensors 128 and 130 may be coupled to a monitoring system 132. Engine 100 may include additional known elements (not shown) as well.

Elements 110-132 are not limited to the configuration shown in FIG. 1. For example, for each cylinder, working member 116 may have any shape and may be movably supported within housing 110 in any manner such that it separates combustion chamber 118 from non-combustion chamber 120. For example, working member 116 may be a rotor that rotates within housing 110, as in a Wankel type internal combustion engine.

Air intake system 112 may be connected to housing 110 and configured to supply air for each cylinder to its combustion chamber 118. Air intake system 112 may include, for example, ducts that route air for each cylinder to its combustion chamber 118. Additionally, air-intake system 112 may include plenums, manifolds, valves, and/or filters. Air intake-system 112 may further include a compressor (not shown) configured to pump pressurized air for each cylinder to its combustion chamber 118.

Fuel system 114 may be configured to deliver fuel, for each cylinder, to its combustion chamber 118. Fuel system 114 may be configured to deliver fuel directly into each combustion chamber 118, as shown in FIG. 1. Alternatively, fuel system 114 may be configured to deliver fuel into air-intake system 112, to be carried to each combustion chamber 118 by air in air-intake system 112.

Exhaust system 122 may be connected to housing 110 and configured to expel combustion gases from each combustion chamber 118 to the atmosphere. Exhaust system 122 may include ducts that route combustion gases from each combustion chamber 118 to various other components of exhaust system 122 and, ultimately, to the atmosphere. Other components of exhaust system 122 may include, for example, one or more turbines, one or more exhaust gas-treatment units, and one or more mufflers (not shown).

Chamber-ventilation system 126 may be configured to vent gas from non-combustion chamber 120. One end of chamber-ventilation system 126 may be connected to non-combustion chamber 120. Another end of chamber-ventilation system 126 may be connected to another component of engine 100 and/or other components of the machine for which engine 100 is being used. For example, chamber-ventilation system 126 may be connected between non-combustion chamber 120 and air-intake system 112. In one embodiment, chamber-ventilation system 126 may connect to a portion of air-intake system 112 on an inlet side of a compressor. Alternatively, chamber-ventilation system 126 may connect to a portion of air-intake system 112 on an outlet side of a compressor. In addition to, or instead of, connecting to air-intake system 112, chamber-ventilation system 126 may connect to exhaust system 122. For example, chamber-ventilation system 126 may connect to a portion of exhaust system 122 between each combustion chamber 118 and a gas-treatment unit (not shown). Other configurations of chamber-ventilation may be implemented as well.

Intake pressure sensor 128 may be configured to sense a fluid pressure (e.g., air pressure) of fluid in the air intake system 112. For example, in one embodiment, intake pressure sensor 128 may be positioned to sense intake pressure for intake gases at a point immediately prior to the gases' entry into one or more combustion chambers 118 (e.g., at an intake manifold). Intake pressure sensor 128 may include any type of known sensor and method capable of measuring or calculating a fluid pressure. Intake pressure sensor 128 is configured to produce a signal relating to the pressure sensed. For example, sensor 128 may be configured to sense a pressure of gases entering a plurality of combustion chambers, and to produce a signal relating to the sensed pressure. The signal may be sent to monitoring system 132 or to another data processing portion of engine 100.

Non-combustion chamber pressure sensor 130 may be configured to sense a fluid pressure (e.g., gas pressure) of fluid in non-combustion chamber 120 (e.g., inside a crankcase). Non-combustion chamber pressure sensor 130 may include any type of known sensor and method capable of measuring or calculating a fluid pressure. Non-combustion chamber pressure sensor 130 is configured to produce a signal (e.g., electronic signal) relating to the pressure sensed. The signal may be sent to monitoring system 132 or to another data processing portion of engine 100.

Monitoring system 132 may be operatively connected to sensors 128 and 130 and configured to monitor and analyze signals produced by sensors 128 and 130 according to the embodiments disclosed herein. Monitoring system 132 may also be operatively connected to other sensors (not shown) and/or control systems (not shown) of engine 100 or the machine on which engine 100 resides. In one embodiment, monitoring system 132 may include one or more processors and memory devices (not shown), and one or more software and/or firmware computer program products stored on a computer-readable medium (e.g., flash memory, hard drive, etc.) and including sets of instructions for monitoring and/or analyzing signals produced by sensors 128 and 130. Monitoring system 132 may comprise a dedicated device for monitoring signals produced by sensors 128 and 130. Alternatively, monitoring system 132 may comprise a controller for engine 100 (e.g., an engine control module, or ECM) and/or any other system of the machine on which engine 100 resides. Monitoring system 132 may include a computer, and may additionally or alternatively include hardwired logic circuitry. Additionally, monitoring system 132 may include or be coupled to an alarm 134 operatively connected to monitoring system or to hardwired logic circuitry of monitoring system 132. In one embodiment, alarm 134 may include an audio device, such as a buzzer or chime, and/or a visual device, such as a light, such that monitoring system 132 sends a message (e.g., a signal) to the alarm to indicate a fault condition. In one embodiment, alarm 134 is displayed on a computer screen display, with optional sound notification (e.g., via speakers, a buzzer, etc.), to notify an operator of alarm events.

Figure 2:
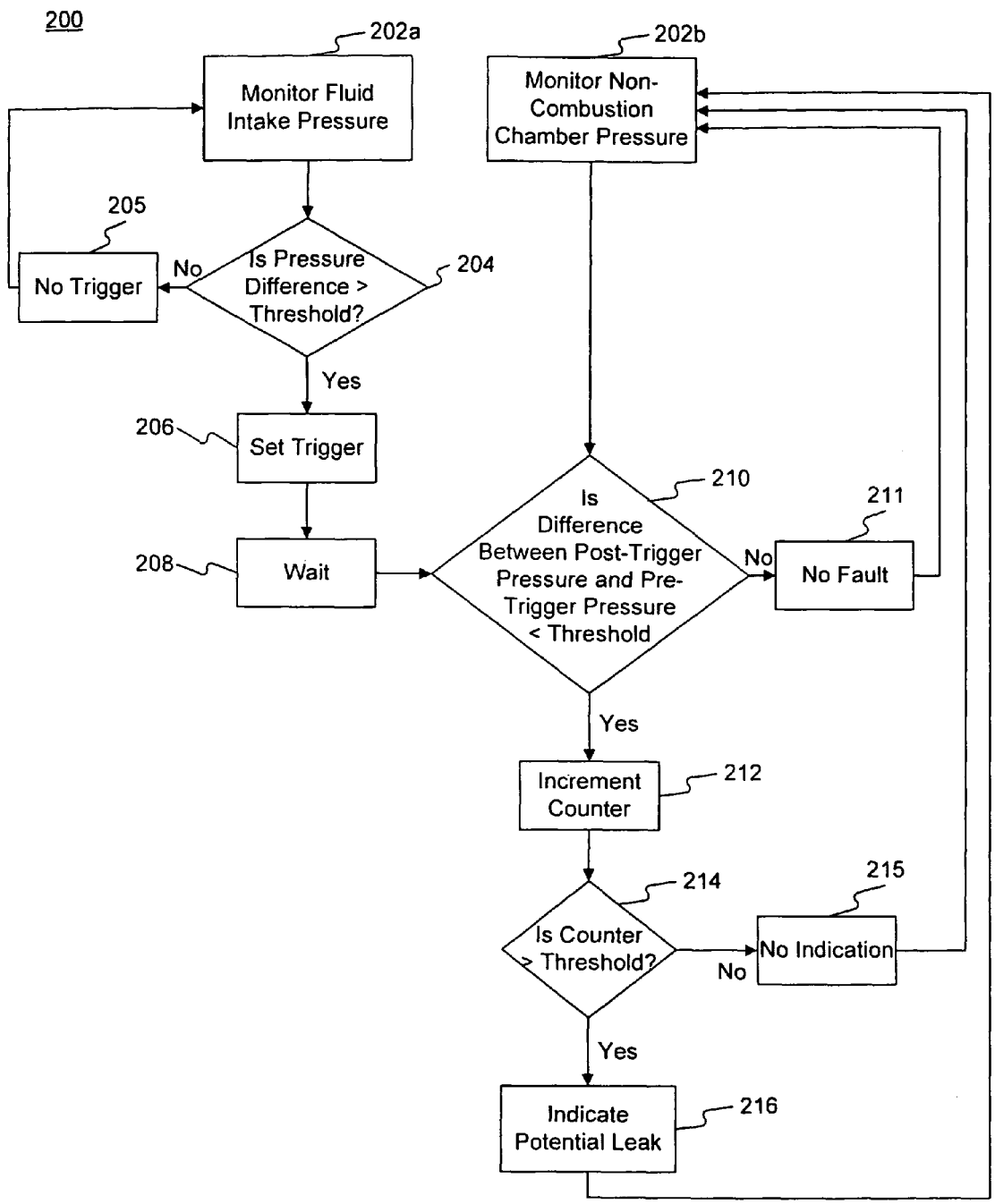
FIG. 2 illustrates an exemplary method consistent with the present disclosure.

In one embodiment, monitoring system 132 includes instructions configured to indicate a fault associated with non-combustion chamber 120. The instructions may be stored on a computer-readable medium, and may be executable on a computer or other data processing device. The fault may be caused by, for example, by a fault in the non-combustion chamber itself (e.g., a crack, corrosion, or other deterioration that causes a fluid leakage), a faulty valve or other component coupled to the crankcase for transferring gasses throughout the engine, or by a faulty sensor. In one embodiment, the instructions for indicating a fault include a routine that implements the method 200 described in FIG. 2.

In steps 202a and 202b of method 200, the intake pressure and non-combustion chamber pressure for the engine are monitored. For example, in one embodiment, intake pressure is detected by intake pressure sensor 128, and values of sensed intake pressure may be stored in a storage for a particular window of time. For example, values may be collected and stored at periodic intervals (e.g., every tenth of a second, half-second, etc.), and may be stored as a rolling buffer, such that a set of values for a particular time window are stored. Similarly, non-combustion chamber pressure may be detected by non-combustion chamber pressure sensor 130, and values of sensed non-combustion chamber pressure may be stored in a storage for a particular window of time.

Figure 3:
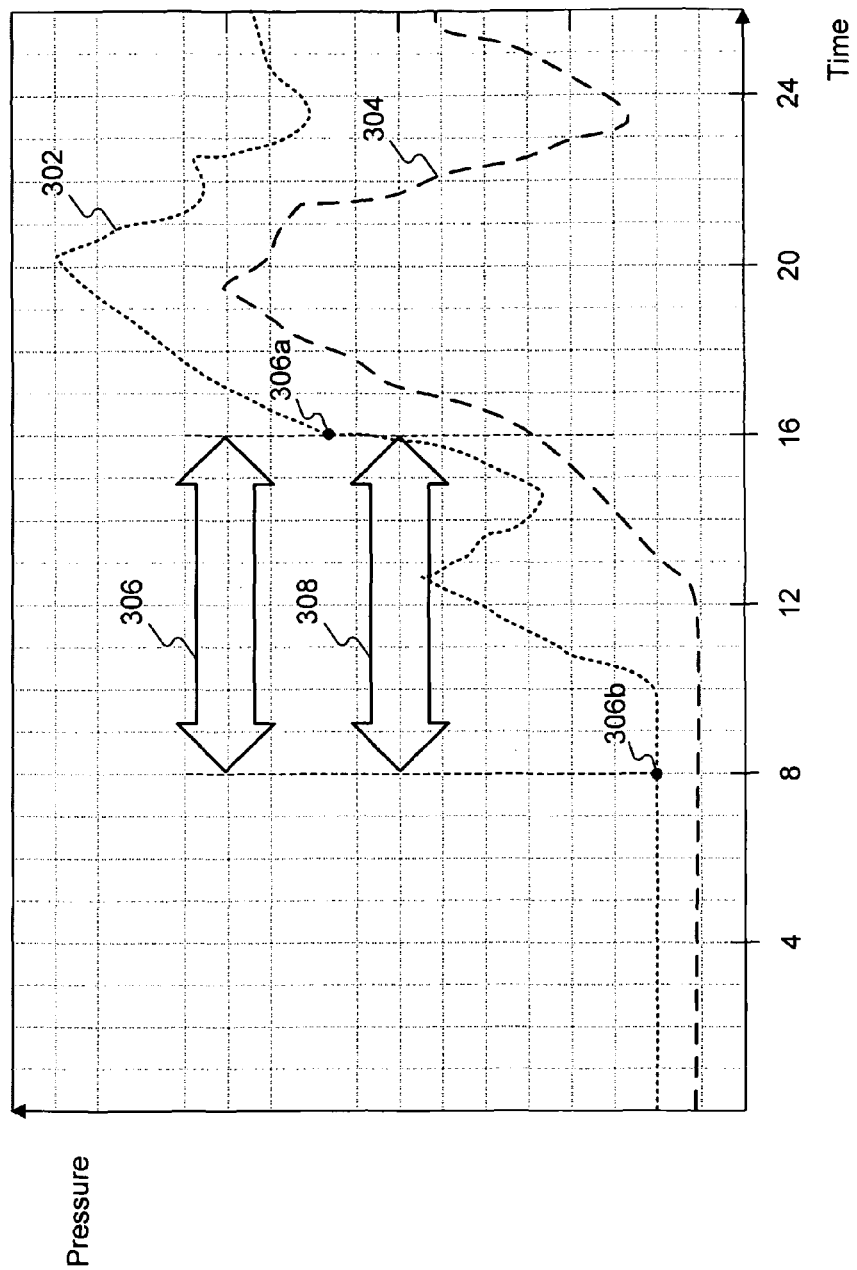
FIGS. 3-5 illustrate graphs of monitored data consistent with the present disclosure.

An example of rolling buffers for intake pressure and non-combustion chamber pressure is depicted in FIG. 3, which depicts a graph of pressure versus time, for both intake pressure and non-combustion chamber pressure of an engine. For example, the data depicted by line 302 represents intake pressure, and the data represented by line 304 represents non-combustion chamber pressure. Arrow 306 represents the rolling buffer for the intake pressure data, and arrow 308 represents the rolling buffer for the non-compression chamber pressure data. That is, arrow 306 spans a period of time for which the collected periodic pressure data for the intake pressure is stored, and arrow 308 spans a period of time for which the collected periodic pressure data for the non-compression chamber pressure is stored. As time progresses, the rolling buffers move forward in time such that the oldest stored pressure values are removed from the buffer and the most recent pressure values are stored. According to the present disclosure, certain data stored in the rolling buffers is analyzed to determine if a potential fault has occurred in connection with the non-combustion chamber 120.

Continuing with method 200, in step 204, it is determined whether a change in intake pressure over a particular period of time for engine 100 is above a threshold value (hereinafter referred to as an "intake threshold value"). For example, an increase in pressure above a certain intake threshold value may indicate a sudden increase in power to the engine (e.g., due to a gear shift, or other sudden power change in the engine). Also, an increase above a certain intake threshold value leads to an expectation that pressure in the non-combustion chamber 120 should also increase by a particular amount, due to the blow-by gases entering the non-combustion chamber 120. As such, a correlation between intake pressure and non-combustion chamber pressure exists, such that under normal operation, a sharp increase in intake pressure leads to a particular expected increase in non-combustion chamber pressure after accounting for expected pressure releases due to ventilation system 126. To determine if the non-combustion chamber pressure is at expected levels, a trigger is set (step 206) when the change in intake pressure over a particular period of time for engine 100 is above a threshold level. So long as the change in intake pressure remains below a threshold level, no trigger is set (step 205).

The change in intake pressure may be determined in different ways. For example, in one embodiment, the routine includes determining the most recent intake pressure value in the buffer (e.g., point 306a) and the oldest intake pressure value in the buffer (e.g., point 306b), and then determining a difference between the two pressure values. In another embodiment, an average of a set of pressure values near the most recent end of the buffer may be determined, and an average of a set of pressure values near the oldest end of the buffer may be determined. A difference between the averages may then be determined. Other methods of determining a change in intake pressure may be employed.

Figure 4:
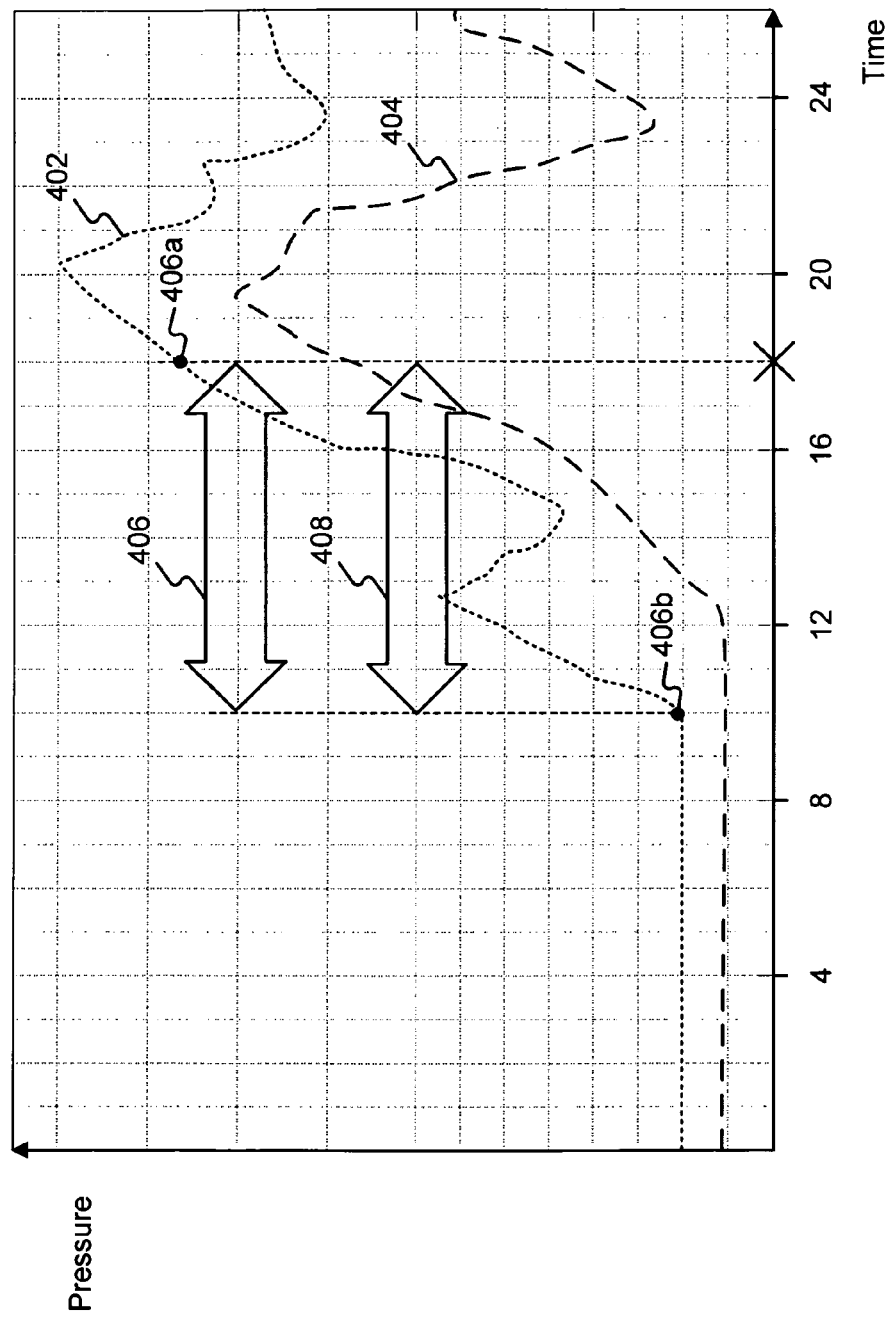

FIG. 4 depicts a point in time at which a trigger has been set. Similar to FIG. 3, the data depicted by line 402 represents intake pressure, and the data represented by line 404 represents non-combustion chamber pressure. Arrow 406 represents the rolling buffer for the intake pressure data, and arrow 408 represents the rolling buffer for the non-compression chamber pressure data. The trigger, which may be set as described above, is depicted at time "X" and is shown with reference to point 406a. Thus, in one embodiment, at time X, the difference between the most recent intake pressure 406a in intake pressure buffer 406 and the oldest intake pressure 406b in intake pressure buffer 406 exceeds an intake threshold value, thus setting a trigger. Typically, a trigger will be set for sudden, transient, and significant intake pressure changes, such as may be associated with a gear shift or other sudden change. For example, in one embodiment, an intake threshold value may be set at two-thirds of the maximum pressure provided to air intake system 112.

Once the trigger is set (step 206), then the routine determines a first non-combustion chamber pressure prior to the trigger being set, and determines a second non-combustion chamber pressure subsequent to the trigger being set. For example, in one embodiment, the routine first waits for a period of time (step 208) so that the rolling buffer for the non-combustion chamber pressure has sufficient data values on both sides of the trigger to determine an accurate pressure on either side of the trigger. In one embodiment, the routine waits until the rolling buffer for the non-combustion chamber pressure is centered around the trigger point, as depicted in FIG. 5.

Figure 5:
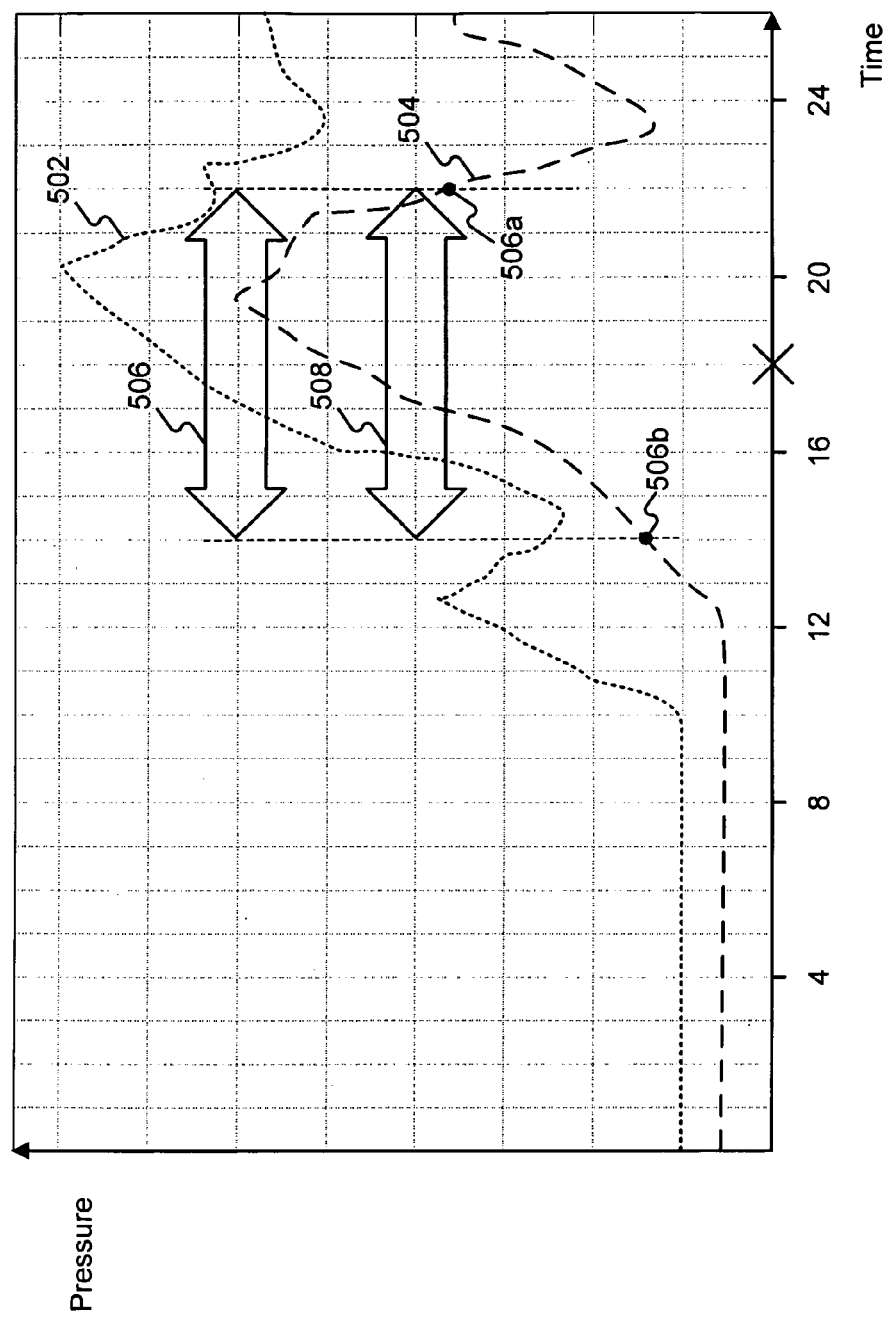

FIG. 5 depicts a point in time at which the intake pressure rolling buffer 506 and non-combustion chamber pressure rolling buffer 508 are centered around the trigger point X. Similar to FIGS. 3 and 4, the data depicted by line 502 represents intake pressure, and the data represented by line 504 represents non-combustion chamber pressure. Arrow 506 represents the rolling buffer for the intake pressure data, and arrow 508 represents the rolling buffer for the non-compression chamber pressure data. The trigger, which may be set as described above, is depicted at time "X."

In the embodiment depicted in FIG. 5, after the routine has waited a period of time—for example, when time X is in the center of the buffer (e.g., time X occurs at 18 seconds and the buffer includes pressure values for times from 14 seconds to 22 seconds)—the routine may determine the change in pressure between pressure in the non-combustion chamber prior to (e.g., at or near point 506b) and subsequent to (e.g., at or near point 506a) the trigger. For example, the routine may determine the difference between a post-trigger pressure point (e.g., point 506a) or series of points (e.g., average pressure for a set of points adjacent to point 506a) in the non-combustion chamber and a pre-trigger pressure point (e.g., point 506b) or series of points (e.g., average pressure for a set of points adjacent to point 506b) in the non-combustion chamber, and then may determine if the absolute value of the difference is below a threshold value (hereinafter referred to as a "chamber threshold value." A difference below the chamber threshold value may indicate that the change in pressure in the non-combustion chamber due to an increased intake pressure value is not as high as expected, which may in turn indicate a potential fluid leak in the non-combustion chamber 120, a potential fluid leak or fault in one or more vents or valves coupled to the non-combustion chamber 120, a fault in one or more of pressure sensors 128 and 130, and/or another fault associated with the operation or monitoring of the non-combustion chamber 120.

If it is determined at step 210 that the difference in pressure in non-combustion chamber 120 between prior to and subsequent to the trigger is below a chamber threshold value (step 210, yes), then an alarm may be set (e.g., alarm 134) indicating a fault associated with non-combustion chamber 120. For example, the fault may indicate one or more of a fluid leakage, a faulty valve, a faulty sensor, etc. The alarm may be, for example, blinking text that states "potential exhaust leakage detected" or the like, or a light, sound, or other indicator that conveys a similar message. In one embodiment, the alarm is a message displayed on a display console or computer screen on the machine containing the engine (e.g., stating, "engine fault," or "crankcase pressure fault" or "exhaust leak detected in the crankcase," etc.), such that the message indicates a potential fluid leakage from the engine or non-combustion chamber. If the change in pressure is above the chamber threshold value (step 210, no), then no fault is detected (step 211) and the routine continues to monitor the pressure values.

In one embodiment, monitoring system 132 maintains a counter, and increments the counter (step 212) each time it is determined that the change in pressure in non-combustion chamber is below the chamber threshold value. Monitoring system 132 then determines whether the counter has reached a counter threshold value (step 214). If the counter reaches the counter threshold value (step 214, yes), then the alarm may be set (step 216), indicating a fault associated with non-combustion chamber 120, and monitoring system 132 may continue to monitor the pressure values. If the counter does not reach the counter threshold value (step 214, no), then no alarm is set, and monitoring system 132 continues to monitor the pressure values.

In an alternative embodiment using a counter, a series of non-combustion chamber pressure difference values is collected for a series of triggers, and for each difference value below a chamber threshold value, a counter is incremented, but for each difference value above the chamber threshold value, the counter is decremented. If the counter reaches a counter threshold, then an alarm is set, but if the counter fails to reach a counter threshold, then no alarm is set. In this manner, the system avoids setting an alarm for inconsistent, fluctuating chamber threshold determinations, thereby only alerting a user or technician when the counter consistently, repetitively indicates a potential fault.

INDUSTRIAL APPLICABILITY

The principles and embodiments disclosed herein may utilize and be applied to different systems. For example, in one embodiment, as described above, the fluid leakage indication system may be used to indicate potential fluid leakages, valve or ventilation system leakages or faults, or pressure sensor faults associated with the non-combustion chamber of an engine, such as a crankcase. Furthermore, the disclosed methods and systems may be applied to other types of pressurized fluid systems, such as any container coupled to a compartment that releases fluid into the container. Furthermore, although a particular computer hardware and software system is described, the disclosed embodiments may be implemented by any computer system capable of monitoring pressure and analyzing the monitored pressure in the manner described herein.

It will be apparent to those skilled in the art that various modifications and variations can be made to the method and system for indicating a fluid leakage described herein. Other embodiments will be apparent to those skilled in the art from consideration of the specification and practice of the disclosed method and system. It is intended that the specification and examples be considered as exemplary only, with a true scope being indicated by the following claims and their equivalents.

What is claimed is:

1. A method of indicating a fault associated with a non-combustion chamber of an engine, comprising:
   monitoring a fluid intake pressure for the engine;
   maintaining a rolling buffer of monitored fluid intake pressure values for the engine;
   comparing a first average of a set of the most recent monitored fluid intake pressure values in the rolling buffer to a second average of a set of the oldest monitored fluid intake pressure values in the rolling buffer;
   setting a trigger if the difference between the first average and the second average exceeds an intake threshold value, wherein the trigger is set as a point in time that corresponds to the most recent monitored fluid intake pressure value;
   monitoring a pressure in a non-combustion chamber of the engine; and
   indicating, if the trigger is set, a fault associated with the non-combustion chamber based on a difference between a first non-combustion chamber pressure and a second non-combustion chamber pressure being below a chamber threshold value.

2. The method of claim 1, wherein the first non-combustion chamber pressure is an average pressure over a time period prior to the trigger, and the second non-combustion chamber pressure is an average pressure over a time period subsequent to the trigger.

3. The method of claim 1, wherein:
   indicating the fault comprises indicating, using an audio and/or visual indicator, a potential fluid leakage in the engine or non-combustion chamber.

4. The method of claim 1, further comprising:
   indicating the fault associated with the non-combustion chamber based on a counter that counts the number of times a difference between a first non-combustion chamber pressure and a second non-combustion chamber pressure is below the chamber threshold value.

5. The method of claim 1, wherein monitoring the fluid intake pressure for the engine further comprises:
   monitoring the fluid intake pressure of gases in an intake manifold coupled to a plurality of combustion chambers in the engine.

6. A method of indicating a potential fluid leakage in a container coupled to a compartment that releases fluid into the container, the method comprising:
   monitoring a fluid pressure in the compartment;
   maintaining a rolling buffer of monitored fluid pressure in the compartment;
   comparing a first average of a set of the most recent monitored fluid pressure values in the rolling buffer to a second average of a set of the oldest monitored fluid pressure values in the rolling buffer;
   setting a trigger if the difference between the first average and the second average exceeds a fluid pressure threshold value, wherein the trigger is set as a point in time that corresponds to the most recent monitored fluid pressure value;
   monitoring a fluid pressure in the container; and
   indicating, if the trigger is set, a fluid leakage in the container based on a difference between a first container fluid pressure and a second container fluid pressure being below a threshold value.

7. The method of claim 6, wherein the first container fluid pressure is an average pressure over a time period prior to the trigger, and the second container fluid pressure is an average pressure over a time period subsequent to the trigger.

8. The method of claim 6, wherein:
indicating the fluid leakage comprises indicating, using an audio and/or visual indicator, that a potential leakage of gases from the container has been detected.

9. The method of claim 6, further comprising:
indicating the fluid leakage in the container based on a counter that counts the number of times a difference between a first container pressure and a second container pressure is below the first threshold value.

10. The method of claim 6, wherein:
the container is an engine crankcase of an engine, and the compartment is a fluid intake compartment for gases entering one or more combustion chambers of the engine.

11. An engine control module for an engine comprising one or more combustion chambers, a non-combustion chamber, and one or more working members between the one or more combustion chambers and the non-combustion chamber, the one or more working members permitting blow-by gasses to enter into the non-combustion chamber from the one or more combustion chambers, wherein the engine control module comprises a computer readable medium storing instructions configured to:
monitor a fluid intake pressure of gases entering the one or more combustion chambers from one or more fluid intake compartments;
maintaining a rolling buffer of monitored fluid intake pressure values for the engine;
comparing a first average of a set of the most recent monitored fluid intake pressure values in the rolling buffer to a second average of a set of the oldest monitored fluid intake pressure values in the rolling buffer;
setting a trigger if the difference between the first average and the second average exceeds an intake threshold value, wherein the trigger is set as a point in time that corresponds to the most recent monitored fluid intake pressure value;
monitor a fluid pressure of gases in the non-combustion chamber; and
transmit, if the trigger is set, a signal which causes a message indicating a potential fluid leakage to be displayed, the signal being transmitted as a function of non-combustion chamber pressure changes resulting from intake pressure changes in the one or more fluid intake compartments.

12. The engine control module of claim 11, wherein the non-combustion chamber comprises a crankcase and the one or more working members comprise one or more pistons.

13. The engine control module of claim 11, wherein the instructions are further configured to:
determine a difference between a first non-combustion chamber pressure and a second non-combustion chamber pressure;
compare the difference to a threshold value; and
if the difference is lower than the threshold value, then transmit the signal.

14. The engine control module of claim 11, wherein the instructions are further configured to:
a) maintain a counter;
b) determine a difference between a first non-combustion chamber pressure and a second non-combustion chamber pressure;
c) compare the difference to a threshold value;
d) if the difference is lower than the threshold value, then increment the counter;
e) repeat steps (b) through (d) until the counter reaches a threshold counter value; and
f) when the counter reaches a threshold counter value, transmit the signal.

15. The engine control module of claim 11, wherein the engine is coupled to an audio and/or visual indicator device such that the instructions are further configured to:
transmit the signal to the device, which causes the device to indicate to a user a potential fluid leakage.

16. The engine control module of claim 11, wherein the instructions further include instructions configured to receive the fluid intake pressure and fluid pressure of gases in the non-combustion chamber from one or more pressure sensors.

* * * * *